Patented Jan. 8, 1924.

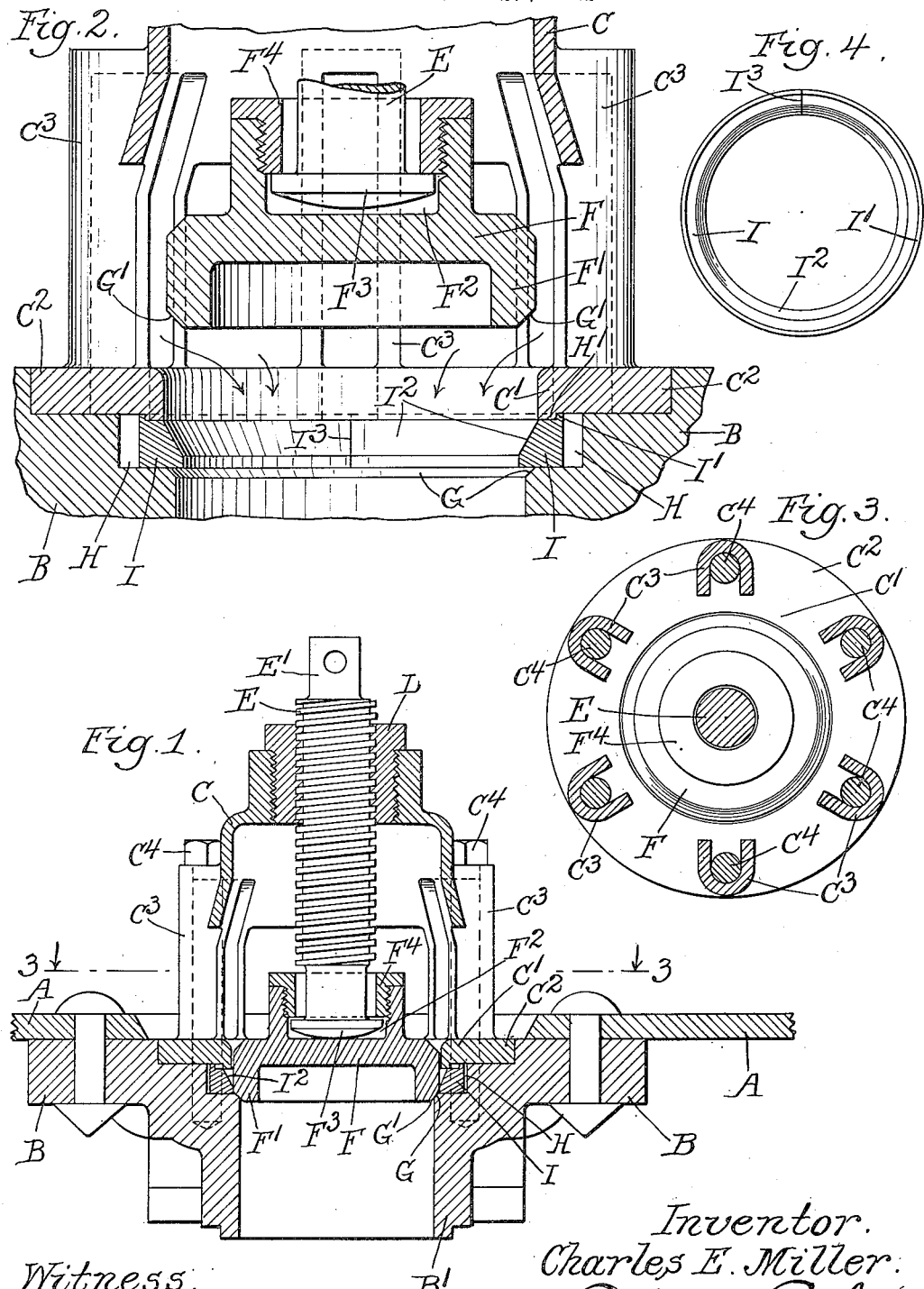

1,479,920

UNITED STATES PATENT OFFICE.

CHARLES E. MILLER, OF CHICAGO, ILLINOIS.

VALVE.

Application filed April 27, 1922. Serial No. 556,905.

*To all whom it may concern:*

Be it known that I, CHARLES E. MILLER, a citizen of the United States, residing at Chicago, in the county of Cook and State of Illinois, have invented a certain new and useful Improvement in Valves, of which the following is a specification.

This invention relates to valves and particularly to valves of the type adapted primarily for use in connection with the outlets of tank cars, although it may be used in any connection in which a valve is needed. One object of the invention is to provide a valve in which the seat is protected from the formation of scale or from the deposit of scale or dirt or any foreign matter upon it. Another object is to provide a valve of such construction that the seat is protected from corrosion or erosion or wear due to the discharge of the liquid over the valve seat. Other objects will appear from time to time throughout the specification and claims.

My invention is illustrated more or less diagrammatically in the accompanying drawings, wherein:

Figure 1 is a vertical cross section of the closed valve in position in the bottom of the tank;

Figure 2 is a similar view on an enlarged scale with parts omitted showing the valve open;

Figure 3 is a horizontal cross section taken on line 3—3 of Figure 1;

Figure 4 is a detail of the spring ring.

Like parts are designated by like characters throughout.

A is the floor of a tank. The valve outlet connection B is riveted to it. The connection B is provided with a downwardly depending tubular portion B' and is provided about the opening of the tubular portion with a cavity within which the valve proper and the valve cage is positioned.

C is a valve cage closed at its top and provided at its bottom with a circular attaching portion C' which has the lateral flange C². Connecting the upper and lower portion of the valve cage are a plurality of upright members C³ through each of which extends a stud screw C⁴ by means of which the valve cage is fastened to the connection B.

In the top of the valve cage is positioned a screw threaded plug D and within this is positioned the valve operating screw E the upper end of which is rectangular in cross section as at D'. To this screw any form of rotating or operating mechanism may be applied. None is shown as the details thereof form no part of the present invention.

F is the valve provided with the downwardly depending skirt F' and having in its upper surface a pocket F². Within this pocket the lower end of the screw E is positioned. It is provided with a laterally extending enlarged head F³. Screw threaded in the pocket F² is a plug F⁴ by means of which the valve and screw are held together. A tight fit is preferably not provided and relative rotation of the screw E and the valve F is permitted.

On the inside of the tubular connection B' is provided a bevelled valve face G. When the valve is closed a correspondingly bevelled face G' on the downwardly depending portion of the valve F contacts the valve seat G to make a sealing fit.

Beneath the portion C' of the valve cage and within the connection member B is an annular cavity H. Adjacent the inner opening of the valve and formed on the bottom of the portion C' is a downwardly depending annular flange H'. Lying within the cavity H is a spring ring I. This ring has upon its upper face an upwardly extending annular flange I' adapted to engage the downwardly depending flange H' of the member C'. The ring is provided on its inner face with a bevelled surface I². It is split at I³ as shown.

The use and operation of my invention are as follows:

When the valve is open the parts are as shown in Figure 2. In that position the spring ring when it is freed from contact with the valve moves inward over the valve seat G and completely covers it. Thus while the valve is open and during discharge the contents of the tank does not strike the valve seat but strikes the bevelled inner surface of the spring ring so that the valve seat is not affected and is not worn. The spring ring remains in this position during the entire time that the valve is open even after the discharge is complete. Thus any scale or other foreign matter of any nature which might be deposited upon the valve seat or which might remain upon the valve seat after the completion of the discharge cannot reach it, but remains upon the inner bevelled face of the spring ring. As the valve moves to the closed position the bevelled seating face of the valve strikes the inner surface of the ring and gradually forces it back within the annular cavity and so gradually exposes the valve seat proper and finally is seated upon it with sealing contact. As the valve is opened the spring ring follows it and remains in contact with it and thus gradually moves forward over the valve seat so that there is no time when the valve is open that the valve seat is exposed, and the moment it becomes open and discharge commences it is protected by the spring ring. The spring ring is preferably fastened to hold it against rotation. It may be pinned to the valve seat by means of a dowel or any other suitable means. It is preferably positioned so the split in it is always behind or opposite one of the members $C^3$.

To further protect the valve seat the discharge lip at the inner edge of the portion $C'$ is raised materially above the valve seat and thus the normal discharge of liquid from the tank due to its pressure will not strike either the valve seat or the spring ring but will be discharged laterally and will not fall rapidly enough to strike the valve seat or the spring ring.

Although I have shown an operative device, still it will be obvious that many changes of size, shape and arrangement of parts might be made without departing materially from the spirit of my invention, and I wish therefore that my showing be taken as in a sense diagrammatical.

I claim:

1. In combination with a valve seat a seat protecting member adapted when the valve is opened to cover the valve seat and when the valve is closed to expose the seat to the valve.

2. In combination with a valve seat a seat protecting member adapted automatically when the valve is opened to cover the valve seat and when the valve is closed to expose the seat to the valve.

3. In combination with a valve seat a seat protecting member adapted when the valve is opened to cover the valve seat and when the valve is closed adapted to be moved by the valve so as to expose the seat.

4. In combination with a valve seat a seat protecting member adapted automatically when the valve is opened to cover the valve seat and when the valve is closed adapted to be moved by the valve so as to expose the seat.

5. In combination with a valve seat a seat protecting member adapted automatically when the valve is opened to move inwardly to overlie the valve seat and adapted when the valve is closed to be moved outwardly to expose the seat to the valve.

6. In combination with a valve seat a seat protecting member adapted automatically when the valve is opened to move inwardly to overlie the valve seat and adapted when the valve is closed to be moved outwardly by the valve to expose the seat to the valve.

7. In combination with a valve seat a spring seat protecting member adapted automatically when the valve is opened to move to cover the valve seat and when the valve is closed to be moved to expose the seat to the valve.

8. In combination with a valve seat a spring seat protecting member adapted automatically when the valve is opened to move to cover the valve seat and when the valve is closed to be moved by the valve itself to expose the seat to the valve.

9. In a valve assembly a valve cage, a valve seat and a valve, a seat protecting member mounted about the valve seat, said member adapted as the valve is opened automatically to move inwardly over the valve seat to overlie the same and adapted when the valve is closed to be moved outwardly so as to expose the valve seat and to permit seating of the valve.

10. In a valve assembly a valve cage, a valve seat and a valve, a seat protecting member mounted about the valve seat, said member adapted as the valve is opened automatically to move inwardly over the valve seat to overlie the same and adapted when the valve is closed to be moved outwardly by the valve itself so as to expose the valve seat and to permit seating of the valve.

11. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly to expose the seat and to permit seating of the valve.

12. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly by the valve itself to expose the seat and to permit seating of the valve.

13. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly to expose the seat and to permit seating of the valve, said ring located within a space within the valve housing and provided with means to prevent its displacement.

14. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly by the valve itself to expose the seat and to permit seating of the valve, said ring located within a space within the valve housing and provided with means to prevent its displacement.

15. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly to expose the seat and to permit seating of the valve, said ring located within a space within the valve housing and provided with means to prevent its displacement, said means comprising a projection within the valve housing and a mating projection on the ring.

16. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly by the valve itself to expose the seat and to permit seating of the valve, said ring located within a space within the valve housing and provided with means to prevent its displacement, said means comprising a projection within the valve housing and a mating projection on the ring.

17. In a valve assembly, a valve cage, a a valve seat and a valve, a seat protecting ring mounted about the valve seat, said ring adapted as the valve is opened automatically to move inwardly and to overlie the valve seat and adapted when the valve is closed to be moved outwardly to expose the seat and to permit seating of the valve, said ring located within a space within the valve housing and provided with means to prevent its displacement, said means comprising a downwardly projecting annular flange within said housing and a mating upwardly projecting annular flange upon said ring.

18. In a valve assembly, a valve cage, a valve seat and a valve, a seat protecting spring ring mounted about the valve seat, said ring adapted as the valve is opened automatically to move inwardly and to overlie the valve seat and adapted when the valve is closed to be moved outwardly by the valve itself to expose the seat and to permit seating of the valve, said ring located within a space within the valve housing and provided with means to prevent its displacement, said means comprising a downwardly projecting annular flange within said housing and a mating upwardly projecting annular flange upon said ring.

Signed at Chicago, county of Cook and State of Illinois, this 24th day of April, 1922.

CHARLES E. MILLER.